UNITED STATES PATENT OFFICE 1,974,518

ALKOXY-AMINO- AND ALKOXY-NITRO-CARBAZOLES

Gerhard Schrader, Opladen, and Fritz Ballauf and Albert Schmelzer, Cologne-Mulheim, Germany, assignors to General Aniline Works, Inc., New York, N. Y., a corporation of Delaware No Drawing. Application July 15, 1931, Serial No. 551,048. In Germany July 19, 1930

7 Claims. (Cl. 260—46)

The present invention relates to new alkoxy-amino- and alkoxy-nitro-carbazoles, more particularly it relates to compounds of the probable general formula:

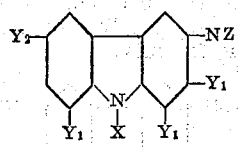

wherein "X" stands for hydrogen or methyl, "$Y_1$" for hydrogen, or an alkoxy group, "$Y_2$" stands for hydrogen, an alkoxy or the —NZ group, at least one "Y" being an alkoxy group, and "Z" stands for $H_2$ or $O_2$.

Our new nitro- and amino-alkoxycarbazoles are obtainable by nitrating the corresponding N-acetyl-alkoxycarbazoles and reducing the nitro compound thus obtained. During the reduction the acetyl group is split off. In order to produce the free nitro-alkoxycarbazoles from the corresponding N-acetyl compounds, the acetyl group is split off in the usual manner by heating, for example, with dilute aqueous alkali. A modification of the process described of preparing our new compounds consists in combining the manufacture of the N-acetyl alkoxycarzazoles and the nitration to one working step, for example, by treating the corresponding alkoxycarbazoles with acetic anhydride in the presence of zinc chloride, and adding nitric acid without isolating the acetyl compound first formed.

Our new compounds are generally well crystallized substances, insoluble in water, soluble in organic solvents, the nitro compounds having a yellow color and the amino compounds having a white color. They are valuable intermediate products for the manufacture of dyestuffs.

The invention is illustrated by the following examples, without being limited thereto:

*Example 1.*—20 parts by weight of 3-methoxy-carbazole are dissolved in 200 parts by weight of acetic anhydride, and 2 parts by weight of zinc chloride are added. The mixture is stirred, and at a temperature of 15° C. 10 parts by weight of nitric acid of the specific gravity 1.4 are added. After a short time the N-acetyl-6-nitro-3-methoxycarbazole separates in the form of yellowish needles of the melting point 220° C. On heating the N-acetyl compound in dilute aqueous alcoholic caustic soda the acetyl group is split off.

The N-acetyl nitro compound may be reduced with the aid of stannous chloride and the resulting tin double salt of the amine is decomposed with the aid of alkalies. After recrystallization from aniline the 6-amino-3-methoxy-carbazole of the formula:

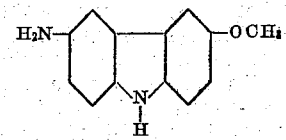

is obtained in the form of white needles of the melting point 285–287° C.

*Example 2.*—197 parts by weight of 2-methoxy-carbazole are dissolved in 1900 parts by weight of acetic anhydride while adding 5 parts by weight of zinc chloride. The mixture is stirred, and at a temperature of 50–80° C. a solution of 70 ccs. of nitric acid of the specific gravity 1.4 in 70 ccs. of acetic anhydride is added. The N-acetyl-2-methoxy-3-nitrocarbazole separates in yellow needles of the melting point 240° C. The reduction may be performed in the usual manner. The 2-methoxy-3-aminocarbazole thus formed having the following formula:

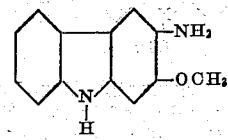

crystallizes from aniline in colorless needles of the melting point 265° C., the hydrochloric acid salt being easily soluble in water.

*Example 3.*—211 parts by weight of 2-ethoxy-carbazole are dissolved in 950 parts by weight of acetic anhydride; to the boiling solution there are added 3 parts by weight of zinc chloride and the solution is boiled for an hour. After cooling to 50° C., a solution of 70 ccs. of nitric acid of the specific gravity 1.4 in 70 ccs. of acetic anhydride is slowly added while stirring. The N-acetyl-2-ethoxy-3-nitrocarbazole then separates in yellow needles and has, after recrystallization from toluene, the melting point 178° C. The 2-ethoxy-3-aminocarbazole obtained by reduction and having the following formula:

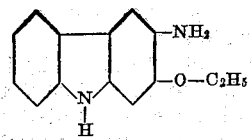

crystallizes from aniline in colorless needles of the melting point 234° C.

*Example 4.*—211 parts by weight of 1-ethoxycarbazole of the melting point 95° C., obtainable by ethylating 1-hydroxycarbazole with ethyl iodide, are dissolved in 550 parts by weight of acetic anhydride. 2.5 parts by weight of zinc chloride are added to the boiling solution. The nitration is effected by a solution of 70 ccs. of nitric acid (specific gravity=1.4) in 70 ccs. of acetic anhydride at a temperature of 25° C. The yellowish needles of the nitro-1-ethoxycarbazole separating have the melting point 128° C. After reduction with ammonium chloride and zinc dust, the amine thus formed having the following formula:

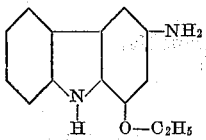

melts, after recrystallization from dilute alcohol, at a temperature of 148° C. In moist air the colorless needles easily change to blue.

*Example 5.*—211 parts by weight of 2-ethoxycarbazole are nitrated as described in Example 3. On cooling with alcoholic potash lye the N-acetyl-2-ethoxy-3-nitrocarbazole is de-acetylated, and 70 parts by weight of the 2-ethoxy-3-nitrocarbazole thus formed are dissolved in a solution containing one liter of alcohol and one liter of 18% potash lye. Then dimethylsulfate is added, while stirring and under reflux condenser, until the red coloration has disappeared. The N-methyl-2-ethoxy-3-nitrocarbazole thus separates in the form of yellow needles, which, when recrystallized from glacial acetic acid, have the melting point 258° C. After reduction of the nitro compound the amine of the following formula:

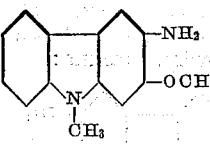

is obtained; on recrystallization from toluene it forms colorless needles of the melting point 190° C. The hydrochloric acid salt of N-methyl-2-ethoxy-3-aminocarbazole is soluble in water.

*Example 6.*—100 parts by weight of 2-hydroxycarbazole are dissolved in 350 ccs. of acetic anhydride and, after the addition of 2 parts by weight of zinc chloride, boiled under reflux condenser. The solution is cooled to 40° C. Then a mixture of 39 ccs. of nitric acid (specific gravity=1.4) and 50 ccs. of acetic anhydride is slowly added, while stirring, at the same time care being taken that the temperature does not exceed 60° C. After cooling the N-acetyl-2-acetoxy-3-nitrocarbazole separates in yellow needles having, when recrystallized from toluene, the melting point 175° C. On heating with alcoholic potash lye the acetyl-nitro compound is saponified to the 2-hydroxy-3-nitro-carbazole. It forms an orange colored substance, difficultly soluble in organic solvents.

113.5 grams of 3-nitro-2-hydroxycarbazole are suspended in 3 liters of alcohol and boiled for a short time with a concentrated aqueous solution of 29 grams of caustic potash. 64 grams of benzyl chloride are then added to the solution boiling under reflux condenser, and the reaction product is further boiled for 4 hours. Then part of the alcohol is distilled off, and the benzyl ether of the 2-hydroxy-3-nitrocarbazole, which separates on cooling, is washed with water and reduced, for example, with iron and acetic acid. The benzyl ether of the 3-amino-2-hydroxycarbazole of the following formula:

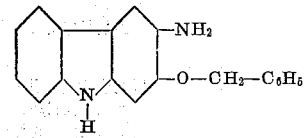

crystallizes from toluene in colorless needles.

*Example 7.*—100 grams of 1.8-diethoxycarbazole (obtainable by ethylating 1.8-dihydroxycarbazole, melting point 104° C.) are dissolved in 900 ccs. of glacial acetic acid, while adding 100 ccs. of acetic anhydride. At a temperature of 30° C. 58.2 grams of nitric acid (86%) are slowly added while stirring. The 1.8-diethoxy-3.6-dinitrocarbazole formed separates in yellow needles of the melting point 258° C. With iron and acetic acid the nitro compound may be reduced in butyl alcohol to the corresponding amine of the following formula:

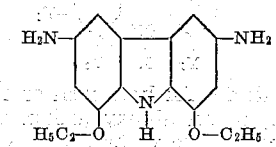

After recrystallization from toluene colorless needles are obtained which in the air quickly change to blue.

We claim:

1. The alkoxycarbazole derivatives of the general formula:

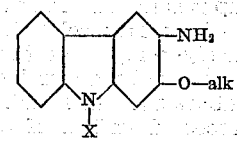

wherein "X" stands for hydrogen or alkyl, "alk" stands for an alkyl group, which derivatives are generally well crystallizing white substances, insoluble in water, soluble in organic solvents, and are valuable intermediate product for the manufacture of dyestuffs.

2. The 2-methoxy-3-aminocarbazole of the following formula:

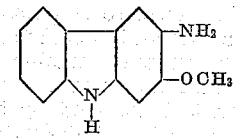

crystallizing in colorless needles of the melting point 265° C., and being a valuable intermediate product for the manufacture of dyestuffs.

3. The N-methyl-2-methoxy-3-aminocarbazole of the following formula:

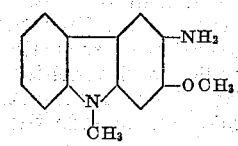

crystallizing in colorless needles, and being a valuable intermediate product for the manufacture of dyestuffs.

4. The alkoxycarbazole derivatives of the general formula:

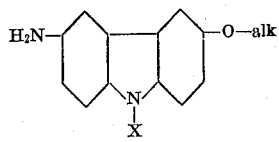

wherein "X" stands for hydrogen or alkyl, "alk" stands for an alkyl group, which derivatives are generally well crystallizing white substances, insoluble in water, soluble in organic solvents, and are valuable intermediate products for the manufacture of dyestuffs.

5. The 6-amino-3-methoxycarbazole of the following formula:

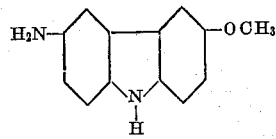

crystallizing in colorless needles of the melting point 285–287° C., and being a valuable intermediate product for the manufacture of dyestuffs.

6. The alkoxycarbazole derivatives of the general formula:

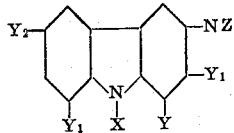

wherein "X" stands for hydrogen or a methyl group, "$Y_1$" stands for hydrogen or an alkoxy group, "$Y_2$" stands for hydrogen, an alkoxy or the —NZ group, at least one of the Y's being an alkoxy group, and "Z" stands for $H_2$ or $O_2$, which derivatives are generally well crystallizing substances, insoluble in water, soluble in organic solvents, the nitro compounds having a yellow color, the amino compounds having a white color, and are valuable intermediate products for the manufacture of dyestuffs.

7. The alkoxycarbazole derivatives of the general formula:

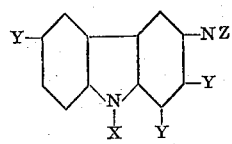

wherein "X" stands for hydrogen or a methyl group, "Y" stands for hydrogen or an alkoxy group, at least one "Y" being an alkoxy group, and "Z" stands for $H_2$ or $O_2$, which derivatives are generally well crystallizing substances, insoluble in water, soluble in organic solvents, the nitro compounds having a yellow color, the amino compounds having a white color, and are valuable intermediate products for the manufacture of dyestuffs.

GERHARD SCHRADER.
FRITZ BALLAUF.
ALBERT SCHMELZER.